No. 626,088. Patented May 30, 1899.
F. H. PAINE & J. L. GIVEN.
MANUFACTURE OF CEMENT CONDUITS OR PIPES.
(Application filed Mar. 18, 1899.)
(No Model.)
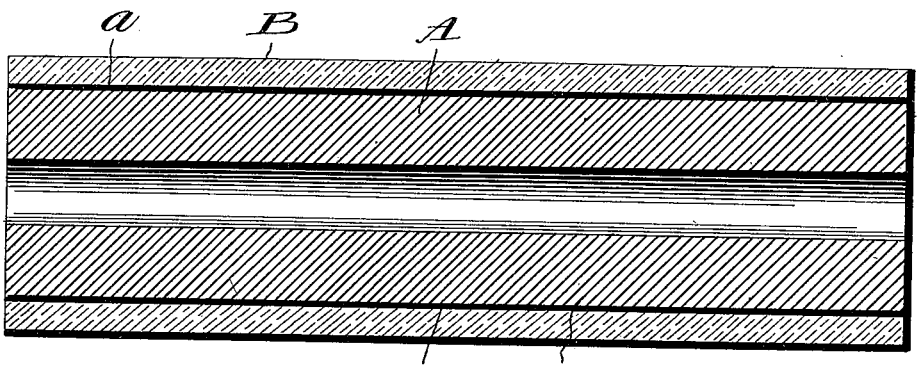
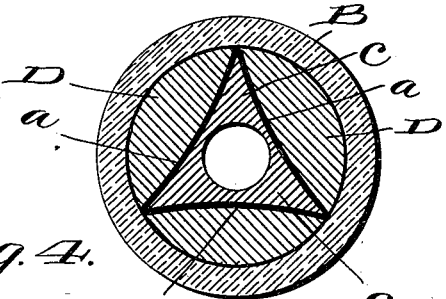
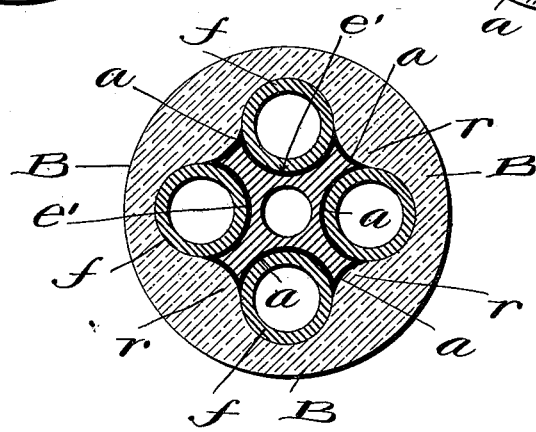
Witnesses
L. C. Hills
Inventors
John L. Given,
Frederick H. Paine
By Marcellus Bailey
Attorney

UNITED STATES PATENT OFFICE.

FREDERICK HENRY PAINE, OF NEWPORT, RHODE ISLAND, AND JOHN LESLIE GIVEN, OF STONY POINT, NEW YORK.

MANUFACTURE OF CEMENT CONDUITS OR PIPES.

SPECIFICATION forming part of Letters Patent No. 626,088, dated May 30, 1899.

Application filed March 18, 1899. Serial No. 709,618. (No model.)

*To all whom it may concern:*

Be it known that we, FREDERICK HENRY PAINE, of Newport, in the county of Newport and State of Rhode Island, and JOHN LESLIE GIVEN, of Stony Point, in the county of Rockland and State of New York, have invented certain new and useful Improvements in the Manufacture of Cement Conduits and Pipes, of which the following is a specification.

Our invention has relation to the manufacture of pipes, conduits, and other tubular or hollow bodies from Portland, hydraulic, or other cement. It is usual to mold such bodies around a core under heavy hydraulic or other pressure, the effect of which pressure is to cause the molded article to hug and adhere to the core so tightly that great difficulty is experienced in removing the core without injury to the article.

The object of our invention is to provide a simple and effective way of removing the core without injuring the conduit or other article molded around it under pressure. To this end we have devised a method of procedure which involves, essentially, providing the core with a coating of material which while hard at ordinary temperatures will become soft or plastic under the influence of moderate heat. Asphalt, for example, is such a material. The core can be coated by dipping it in this material and then allowing it to dry, the dipping operation being repeated until the desired thickness or coating has been arrived at. Around the core thus prepared the cement conduit or other article is molded under heavy pressure in the usual way. After the molded cement body has "set" the core can be removed by heating it until the coating has melted or softened sufficiently, after which the core can be readily and easily withdrawn. The core can be heated in any suitable or preferred way. For this purpose it can be conveniently made hollow to permit steam or hot air to be passed through it, or it may be otherwise heated internally. In the case of a core or mandrel which is solid (in the sense of not being sectional) the coating will of course be upon the exterior surface of the core next to the cement body, which is molded around it; but in the case of a sectional core it will suffice to thus coat only the central or key piece of the core, or, as it may be termed, the "core proper," upon the withdrawal of which the outlying sections can of course be drawn out without trouble.

The application of an external layer of asphalt or the like to the core has the further advantage that when this layer is melted or softened the subsequent withdrawal of the core will leave a coating or lining of this substance upon the interior surface of the molded article, which is a point of considerable importance in cement conduits designed for certain uses.

In the accompanying drawings, to which we will now refer for a better understanding of our invention, Figure 1 represents in longitudinal axial section a core prepared in accordance with our invention and a cement conduit molded around it, both the core and conduit being of any desired length. Fig. 2 is a cross-section of the same; and Figs. 3 and 4 are cross-sections of modifications, which will be hereinafter more specifically referred to.

In Figs. 1 and 2, A is the metal core, which is tubular or hollow and with walls of sufficient thickness to resist the heavy pressure to which it is subjected. *a* is the coating of asphalt or other material, which will soften or become plastic under the influence of heat—as, for example, steam, hot air, or hot water—introduced into and passed through the hollow or tubular core A. B is the cement conduit or pipe, molded under heavy pressure around the coated core A. Molding apparatus for this purpose, usually operated by hydraulic pressure, is well known and requires no description or illustration here.

By the application of heat, as above described, the asphalt coating *a* can be melted or softened sufficiently to permit the ready withdrawal of the core from the cement pipe, leaving the coating in whole or in part deposited as a lining upon the interior surface of the cement conduit B.

In lieu of having the core solid or in one piece it can be built up or made of several pieces or sections. Such a construction is shown in Fig. 3, in which *c* is the center piece or core proper and $d$ the surrounding core-sections, and B is the cement conduit or pipe. The center piece $c$ only need be coated with asphalt or its equivalent, and such a coating is represented at $a$ in this figure. The center piece or core proper also is tubular for the admission of the heating agent. Such a core is of value when it is desired not to coat or line the interior of the conduit with the material of which the coating $a$ is comprised; but all of the sections $d$ may also have a coating $a$, if desired, and they can also be made tubular or hollow for the admission of the heating agent. In this form of core after the coating $a$, surrounding the central piece or core proper, $c$, has been melted or softened this part $c$ can readily be withdrawn and then the outlying sections $d$ can easily be removed one by one.

Another form of sectional core is shown in Fig. 4, in which $e$ is the central core or key piece, and $f$ are tubes fitted to said central core. B is the cement conduit or pipe. In this form the central core $e$ has four radially-branching arms, in which are formed cradles $e'$, semicircular in cross-section, four in number, to receive the tubes $f$. The central core $e$, which is tubular, is the only part that need be coated with the asphalt or equivalent material, and such coating is represented at $a$; but of course the other sections or tubes $f$ can be thus coated, if desired. After the coating $a$ has been melted or softened the central core $e$ is first withdrawn, and then the tubes $f$ can be drawn out one by one with facility. The cement pipe B, formed upon such a core, will be thickened and reinforced upon its interior by longitudinal ribs $r$.

We are aware that it has been proposed to facilitate the removal of asphaltum or bitumen pipe from the mandrel on which it is formed by heating the mandrel until the asphaltum pipe has been softened by the heat sufficiently to permit it to be slipped from the mandrel, very much after the same fashion that ice-cream and candles have been removed from their molds and ice blocks have been removed from their freezing-tanks, and this, of course, we do not claim; but What we do claim herein as new and of our own invention, and desire to secure by Letters Patent, is as follows:

1. In the manufacture of cement conduits and other hollow bodies, the method of removing the cement body from the core or mandrel around which it is formed, which consists in preliminarily coating the core with a material which will soften or become plastic under the influence of heat, and then after the cement body has been molded around or upon the coated core, melting or softening the coating by the application of heat, and withdrawing the core, substantially as and for the purposes hereinbefore set forth.

2. In apparatus for molding cement conduits and other hollow bodies, a tubular core coated with a material which will soften or become plastic under the influence of heat, substantially as and for the purposes hereinbefore set forth.

3. In apparatus for molding cement conduits and other hollow bodies, a sectional mandrel, the center or key piece of which, or core proper, is tubular and coated with a material which will soften or become plastic under the influence of heat, substantially as and for the purposes hereinbefore set forth.

In testimony whereof we have hereunto set our hands this 14th day of March, 1899.

FREDERICK HENRY PAINE.
JOHN LESLIE GIVEN.

Witnesses as to Fredk. H. Paine:
DAVID C. RITTENHOUSE,
D. M. KINDLEBERGER.
Witnesses as to John Leslie Given:
HARRY S. BANDLER,
BARTON WHITTEMORE.